(12) United States Patent
Mabuchi

(10) Patent No.: US 9,918,205 B2
(45) Date of Patent: Mar. 13, 2018

(54) COMMUNICATION SYSTEM

(71) Applicant: TOYOTA JIDOSHA KABUSHIKI KAISHA, Toyota-shi, Aichi-ken (JP)

(72) Inventor: Mitsuhiro Mabuchi, Shinagawa-ku (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/021,083

(22) PCT Filed: Sep. 12, 2014

(86) PCT No.: PCT/IB2014/001984
§ 371 (c)(1),
(2) Date: Mar. 10, 2016

(87) PCT Pub. No.: WO2015/036854
PCT Pub. Date: Mar. 19, 2015

(65) Prior Publication Data
US 2016/0219413 A1 Jul. 28, 2016

(30) Foreign Application Priority Data
Sep. 13, 2013 (JP) ................... 2013-190042

(51) Int. Cl.
*H04W 4/04* (2009.01)
*H04L 12/24* (2006.01)

(52) U.S. Cl.
CPC .......... *H04W 4/046* (2013.01); *H04L 41/069* (2013.01)

(58) Field of Classification Search
CPC ............. G06Q 10/063; G01C 21/362; G08G 1/096838; H04L 67/125; H04L 51/38;
(Continued)

(56) References Cited

U.S. PATENT DOCUMENTS 7,599,680 B2 * 10/2009 Patenaude ............ H04M 15/00
370/350
7,636,564 B2 * 12/2009 Funato .................. G06Q 10/063
455/412.1
(Continued)

FOREIGN PATENT DOCUMENTS

| JP | 2008-120173 A | 5/2008 |
| JP | 2010-45605 A | 2/2010 |
| JP | 2013-172200 A | 9/2013 |

OTHER PUBLICATIONS

Roland Kammerer, et al., "Dynamic Configuration of a Time-Triggered Router for Controller Area Network", Proceedings of 2012 IEEE 17th International Conference on Emerging Technologies & Factory Automation (ETFA 2012): Krakow, Poland, Sep. 17-21, 2012, IEEE, Piscataway, NJ, Sep. 17, 2012, pp. 1-10.
(Continued)

*Primary Examiner* — Nizar Sivji
(74) *Attorney, Agent, or Firm* — Sughrue Mion, PLLC

(57) ABSTRACT

A communication system that transmits and receives a message including an amount of data and an identifier determined for the contents of each data. The communication system includes a device that receives the message and includes an processor that processes data in the message, a detector that detects a vehicle situation, and an storage that stores attributes, wherein the storage stores an identification code, a situation code determined according to the vehicle situation, and an attribute determined corresponding to a combination of the identification code and the situation code as the attribute, and the processor acquires, based on a combination of the identification code corresponding to the identifier of the received message and the situation code corresponding to the vehicle situation detected by the detector, an attribute corresponding to the combination among the
(Continued)

attributes stored in the storage, and processes data of the received message based on the acquired attribute.

8 Claims, 19 Drawing Sheets

(58) Field of Classification Search
CPC ........ H04L 51/18; H04W 4/12; H04W 4/008; H04W 4/046; H04W 88/182; H04M 15/00
See application file for complete search history.

(56) References Cited

U.S. PATENT DOCUMENTS

| | | | |
|---|---|---|---|
| 2003/0139179 A1* | 7/2003 | Fuchs | G07C 5/008 455/426.1 |
| 2010/0040071 A1 | 2/2010 | Goto et al. | |
| 2015/0019897 A1 | 1/2015 | Horihata | |

OTHER PUBLICATIONS

International Search Report for PCT/IB2014/001984 dated Feb. 6, 2015 [PCT/ISA/210].
Written Opinion for PCT/IB2014/001984 dated Feb. 6, 2015 [PCT/ISA/237].

* cited by examiner

| VEHICLE SITUATION | SITUATION CODE |
|---|---|
| NORMAL TRAVELING | 001 |
| DURING RIGHT TURN | 010 |
| DURING LEFT TURN | 011 |
| HIGH-SPEED TRAVELING | 100 |

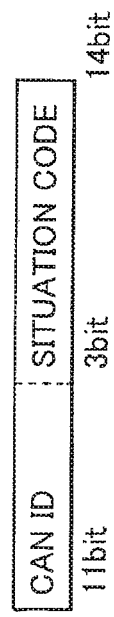

FIG. 6

| CAN ID | SITUATION CODE | CATEGORY | IMPORTANCE | EXPIRATION DATE |
|---|---|---|---|---|
| 11100100111 | 000 | ALARM 1 | 9 | Now |
| 11010011001 | 000 | ALARM 2 | 8 | Now |
| 10010010010 | 000 | ALARM 3 | 6 | Now |
| 01001000100 | 000 | GENERAL 1 | 3 | Now |
| 01101011010 | 001 | GENERAL 2 | 4 | 1min |
| 01101011010 | 010 | GENERAL 2 | 5 | 0.5min |
| 10101010101 | 000 | GENERAL 2 | 2 | Anytime |
| 11101000010 | 001 | GENERAL 2 | 2 | Anytime |
| 11101000010 | 010 | GENERAL 2 | 4 | 1min |
| 11101000010 | 011 | GENERAL 2 | 5 | Now |

F I G. 14

| DATA FIELD | | | | |
|---|---|---|---|---|
| 010001 | 101011 | 10000100 | ... | 0001011 |
| 1-6bit | 7-12bit | 13-20bit | 21-55bit | 56bit | 57-64bit |
| INFORMATION A | | INFORMATION B | | INFORMATION C |

Note: the bit range "56bit" corresponds to a single "1" value and INFORMATION C spans 57-64bit as "0001011".

F I G. 15

| | POSITION | POSITION CODE |
|---|---|---|
| INFORMATION A | 1-6bit | 000000 |
| INFORMATION B | 13-20bit | 001100 |
| INFORMATION C | 56bit | 111000 |

FIG. 16

| CAN ID | POSITION CODE | SITUATION CODE |
|---|---|---|
| 11bit | 6bit | 3bit |

20bit

FIG. 17

| COMBINATION OF CAN ID, POSITION CODE, AND SITUATION CODE | | | ATTRIBUTE | | |
|---|---|---|---|---|---|
| CAN ID | POSITION CODE | SITUATION CODE | CATEGORY | IMPORTANCE | EXPIRATION DATE |
| 11001100110 | 000000 | 001 | GENERAL 2 | 3 | 1min |

FIG. 18

| CAN ID | POSITION CODE | SITUATION CODE | CATEGORY | IMPORTANCE | EXPIRATION DATE |
|---|---|---|---|---|---|
| 11100100111 | 011000 | 000 | ALARM 1 | 9 | Now |
| 11010011001 | 000110 | 000 | ALARM 2 | 8 | Now |
| 10010010010 | 001110 | 000 | ALARM 3 | 6 | Now |
| 01001000100 | 000101 | 000 | GENERAL 1 | 3 | Now |
| 01101011010 | 001100 | 001 | GENERAL 2 | 4 | 1min |
| 01101011010 | 001100 | 010 | GENERAL 2 | 5 | 0.5min |
| 10101010101 | 000011 | 000 | GENERAL 2 | 2 | Anytime |
| 11101000010 | 000000 | 001 | GENERAL 2 | 2 | Anytime |
| 11101000010 | 000000 | 010 | GENERAL 2 | 4 | 1min |
| 11101000010 | 000000 | 011 | GENERAL 2 | 5 | Now |

F I G. 21

COMBINATION OF ADDRESS AND SITUATION CODE

| ADDRESS | SITUATION CODE | ATTRIBUTE | | |
|---------|----------------|-----------|---|---|
| | | CATEGORY | IMPORTANCE | EXPIRATION DATE |
| 1231h | 001 | GENERAL 2 | 3 | 1min |

F I G. 22

ADDRESS = 1230h

| POSITION | POSITION CODE |
|----------|---------------|
| INFORMATION A | 2nd byte | 000001 |
| INFORMATION B | 4th byte | 000011 |
| INFORMATION C | 8th byte | 000111 |

F I G. 23

| ADDRESS | POSITION CODE | SITUATION CODE |
|---------|---------------|----------------|
| n bit | 6bit | 3bit |

(n+9) bit

F I G. 24

| COMBINATION OF ADDRESS, POSITION CODE, AND SITUATION CODE | | | ATTRIBUTE | | |
|---|---|---|---|---|---|
| ADDRESS | POSITION CODE | SITUATION CODE | CATEGORY | IMPORTANCE | EXPIRATION DATE |
| 1230h | 000001 | 001 | GENERAL 2 | 3 | 1min |

FIG. 25

COMMON DATABASE
131

| CONVERSION CODE | | |
|---|---|---|
| 1100110110 | 000001 | 001 | ATTRIBUTE FOR INFORMATION A |
| 1100110110 | 001101 | 001 | ATTRIBUTE FOR INFORMATION B |

FIG. 26

VEHICLE TYPE A

| ID FIELD | DATA FIELD | | | | |
|---|---|---|---|---|---|
| CAN ID | INFORMATION A | 101011 | INFORMATION B | ... | INFORMATION C | 0001011 |
| 11bit | 1-8bit | 9-12bit | 13-20bit | 21-55bit | 56bit | 57-64bit |

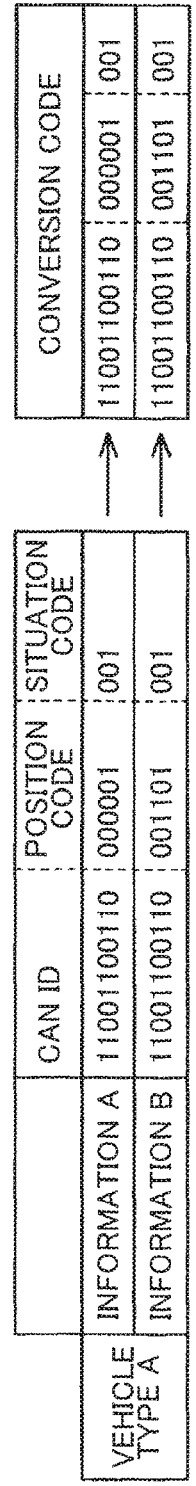

FIG. 29

| VEHICLE TYPE B | | | | | |
|---|---|---|---|---|---|
| ID FIELD | DATA FIELD | | | | |
| CAN ID | INFORMATION B | 101011 | INFORMATION A | ... | INFORMATION C | 0001011 |
| 11bit | 1-8bit | 9-12bit | 13-20bit | 21-55bit | 56bit | 57-64bit |

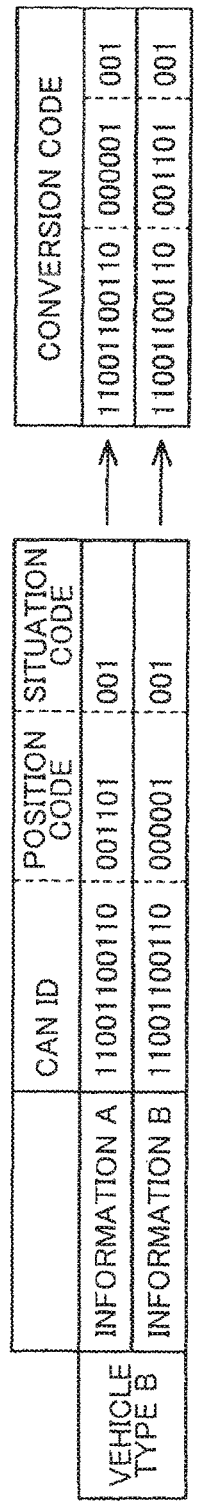

COMMUNICATION SYSTEM

CROSS REFERENCE TO RELATED APPLICATIONS

This application is a National Stage of International Application No. PCT/IB2014/001984, filed on Sep. 12, 2014, which claims priority from Japanese Patent Application No. 2013-190042, filed on Sep. 13, 2013, the contents of all of which are incorporated herein by reference in their entirety.

BACKGROUND OF THE INVENTION

1. Field of the Invention

The present invention relates to a communication system in which a plurality of communication devices are network-connected in a vehicle or the like.

2. Description of Related Art

As well known in the art, there are many cases where a vehicle network system is configured, in which a plurality of electronic control units (ECUs) mounted in a vehicle are network-connected to transmit and receive information (vehicle information) of the ECU. Then, one of communication systems which configure the vehicle network system is a controller area network (CAN).

On the other hand, in the CAN, the amount of data capable of being transmitted by one communication message is restricted to 64 bits. Accordingly, in the related art, a communication system capable of efficiently using communication data taking into consideration the restriction of the amount of data is suggested. For example, Japanese Patent Application Publication No. 2008-120173 (JP 2008-120173 A) describes a system which performs adjustment over a plurality of ECUs through communication by the CAN.

The system described in JP 2008-120173 A includes a plurality of ECUs (units) communicably connected to a CAN bus, and is able to adjust illumination luminance of backlights of a plurality of ECUs through CAN communication. That is, each unit includes a luminance setting table in which the same table data is set. Each luminance setting table has Table 1 to Table 10, and as the same table number, a numerical value correlated with another unit is set. Then, each ECU receives an instruction to change a table data number through CAN communication, thereby adjusting luminance of the backlight referring to the luminance setting table.

On the other hand, in recent years, with high function of the vehicle intended for improvement of convenience or the like, each ECU requires more information for processing for realizing high function. However, as described above, in a vehicle network, such as a CAN having the restriction of the amount of data, it is difficult to achieve an increase in the amount of data communicable between the respective ECUs, and it is not easy to change a vehicle network to a configuration capable of communicating a lot of data.

SUMMARY OF THE INVENTION

The invention provides a communication system capable of using information required for improvement of convenience while suppressing an increase in the amount of communication data.

A first aspect of the invention relates a communication system that transmits and receives a communication message including a defined amount of data and an identifier determined for each of the contents of data. The communication system includes a communication device that receives the communication message and that includes an information processing unit that processes data in the communication message, a vehicle situation detection unit that detects a vehicle situation, and an attribute storage unit that stores attributes, wherein the attribute storage unit stores an identification code corresponding to the identifier, a situation code determined according to the vehicle situation, and an attribute determined corresponding to a combination of the identification code and the situation code as the attribute, and the information processing unit acquires, based on a combination of the identification code corresponding to the identifier of the received communication message and the situation code corresponding to the vehicle situation detected by the vehicle situation detection unit, an attribute corresponding to the combination among the attributes stored in the attribute storage unit, and processes data of the received communication message based on the acquired attribute.

A second aspect of the invention relates to a communication system that transmits and receives a communication message including a defined amount of data with a plurality of pieces of information and an identifier determined for each of the contents of data. The communication system includes a communication device that receives the communication message and that includes an information processing unit that processes data in the communication message, a vehicle situation detection unit that detects a vehicle situation, and an attribute storage unit that stores attributes, wherein the attribute storage unit stores an identification code corresponding to the identifier of the communication message, a position code representing a data position in the communication message for each piece of information included in the communication message, a situation code determined according to the vehicle situation, and an attribute determined corresponding to a combination of the identification code, the position code, and the situation code as the attribute, and the information processing unit acquires, based on a combination of the identification code corresponding to the identifier of the received communication message, the position code of each piece of information included in the received communication message, and the situation code corresponding to the vehicle situation detected by the vehicle situation detection unit, an attribute corresponding to the combination among the attributes stored in the attribute storage unit, and processes data of the received communication message based on the acquired attribute.

According to the above-described aspect, an attribute according to a vehicle situation, such as a vehicle state or a vehicle outside environment, is made to correspond to a received communication message. That is, an attribute is made to correspond to a communication message without changing a communication message. Accordingly, an attribute is made to correspond to a communication message without increasing the amount of communication of a communication message or the like. A communication message is processed based on an attribute, whereby it is possible to suitably process any communication message with a limited amount of data. As the communication for use in a vehicle, there is communication using a CAN bus, or the like.

For a communication message in which a plurality of pieces of data are stored is used, a position code is used in combination, whereby it is possible to specify data, to acquire an appropriate attribute for each piece of data, and to associate the attribute with data.

In the above-described aspects, the vehicle situation detection unit may detect a vehicle state that is the state of a vehicle as one of the vehicle situations. According to this aspect, it is possible to make an attribute according to a vehicle state correspond to a communication message.

In the above-described aspects, the vehicle situation detection unit may detect a vehicle outside environment that is an environment outside a vehicle as one of the vehicle situations. According to this aspect, it is possible to make an attribute according to a vehicle outside environment correspond to a communication message.

The identification code stored in the attribute storage unit may match the identifier of the communication message. According to this aspect, an identification code is used as an identifier of a communication message, making it easy to set an identification code. For example, "CAN ID" for use in communication with a CAN bus is determined to have a unique value for each type of data included in a communication message, making it easy to make an identification code be different for each communication message.

In the above-described aspects, the communication device that receives the communication message may include a data storage unit in which data is held in a determined address for each piece of data acquired from the received communication message, and an identification code stored in the attribute storage unit may be determined based on an address of the data storage unit in which data of a corresponding communication message is held.

According to the above-described aspects, an identification code is determined to correspond to an address of the data storage unit in which "data" of a communication message is held, making it easy to set an identification code. For example, an address of a memory may be used as an identification code as it is. When an address is determined to be different according to data, it becomes easy to make an identification code be different according to data.

In the above-described aspects, the attribute storage unit may store an attribute code corresponding to each attribute, and a combination of an identification code and a situation code corresponding to the attribute code, and the information processing unit may acquire an attribute corresponding to the same attribute code as an attribute code corresponding to a combination of an identification code and a situation code as an attribute corresponding to the combination.

In the above-described aspects, the attribute storage unit may store an attribute code corresponding to each attribute, and a combination of an identification code, a position code, and a situation code corresponding to the attribute code, and the information processing unit may acquire an attribute corresponding to the same attribute code as an attribute code corresponding to a combination of an identification code, a position code, and a situation code as an attribute corresponding to the combination.

According to the above-described aspects, since there are a lot of data to which the same attribute is allocated, the same attribute is made to correspond to a plurality of pieces of data through attribute codes, whereby it is possible to suppress the amount of data having the attributes stored in the attribute storage unit. In this case, while the attribute codes are required instead of the attributes, the amount of data of the attribute codes is made smaller than the amount of data of the attributes, thereby suppressing the storage capacity required for the attribute storage unit.

In the above-described aspects, an attribute stored in the attribute storage unit may include information of an expiration date of data corresponding to the attribute, and the communication device that receives the communication message may further include a determination unit that performs determination about whether or not data of the received communication message is able to be processed until an expiration date included in an attribute corresponding to data.

According to the above-described aspect, an expiration date is made to correspond to data, whereby it is possible to process data until the expiration date. When data is unable to be processed until the expiration date, data is not processed. In this way, it is possible to perform processing according to the expiration of the expiration date. For example, in case of data output to a driving assistance device, it is possible to reduce a sense of discomfort of the user on information provision, for example, it is possible to provide data at the right time and to prevent inopportune data provision.

In the above-described aspects, when processing of data of another received communication message is performed after processing of data of one received communication message ends, and when the determination unit determines that the processing of data of another received communication message is completed before an expiration date included in an attribute of data of another received communication message, the information processing unit may start the processing of data of another received communication message after the processing of data of the one received communication message ends.

According to the above-described aspect, when a plurality of pieces of data are received, it is possible to adjust the output time according to the expiration date of data. For example, when subsequent data is received during processing of data received previously, in regards to a processing aspect of data received subsequently, it is possible to determine an appropriate aspect in consideration of the expiration date of data. With this, user convenience or recognition property is increased, and for example, it is possible to appropriately output a plurality of pieces of data at the right time.

In the above-described aspects, the information processing unit may acquire a vehicle situation from the vehicle situation detection unit with the reception of a communication message. According to this aspect, it is possible to make an appropriate attribute according to a vehicle situation correspond to data of a received communication message.

In the above-described aspects, the plurality of communication devices may be communicably connected by a CAN bus, and may transmit and receive a communication message through the CAN bus. According to this aspect, it is possible to make an attribute according to a vehicle situation correspond to a communication message using a CAN bus having the restriction of the amount of data. Making an attribute correspond to a communication message can be performed without changing the allocation of "CAN ID" to the communication message, and thus this is easily applied.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a schematic view showing a combination aspect of an ID and a situation code in the communication system;

FIG. 5 is a schematic view schematically showing the relationship between a combination of an ID and a situation code, and an attribute in the communication system;

FIG. 6 is a list showing an example of a combination of an ID and a situation code and a corresponding attribute in the communication system;

FIG. 14 is a schematic view schematically showing the structure of data of a communication message in a second embodiment of a communication system;

FIG. 15 is a list showing an example of a position code representing a data position of a communication message in the communication system;

FIG. 16 is a schematic view showing a combination aspect of an ID, a position code, and a situation code in the communication system;

FIG. 17 is a schematic view schematically showing the relationship between a combination of an ID, a position code, and a situation code, and an attribute in the communication system;

FIG. 18 is a list showing an example of a combination of an ID, a position code, and a situation code and a corresponding attribute in the communication system;

FIG. 21 is a schematic view schematically showing the relationship between a combination of an address of a memory and a situation code, and an attribute in the communication system;

FIG. 22 is a list showing an example of a position code representing a data position in an address of a memory, in which data of a communication message is held, in a fourth embodiment of a communication system;

FIG. 23 is a schematic view schematically showing the relationship between a combination of an address, a position code, and a situation code, and an attribute in the communication system;

FIG. 24 is a list showing an example of a combination of an address, a position code, and a situation code and a corresponding attribute in the communication system;

FIG. 25 is a list showing an example of a common database including a conversion code and an attribute in a fifth embodiment of a communication system;

FIG. 26 is a schematic view schematically showing the structure of a communication message of a vehicle type A in the communication system;

FIG. 27 is a schematic view showing a combination aspect of an ID, a position code, and a situation code determined according to information for each piece of information of the vehicle type A in the communication system;

FIG. 28 is a list showing an example of a conversion code corresponding to a combination of an ID, a position code, and a situation code of each piece of information of the vehicle type A in the communication system;

FIG. 29 is a schematic view schematically showing the structure of a communication message of a vehicle type B in the communication system;

FIG. 30 is a schematic view showing a combination aspect of an ID, a position code, and a situation code determined according to information for each piece of information of a vehicle type B in the communication system; and FIG. 31 is a list showing an example of a conversion code corresponding to a combination of an ID, a position code, and a situation code of each piece of information of the vehicle type B in the communication system.

DETAILED DESCRIPTION OF EMBODIMENTS

First Embodiment

Figure 1:
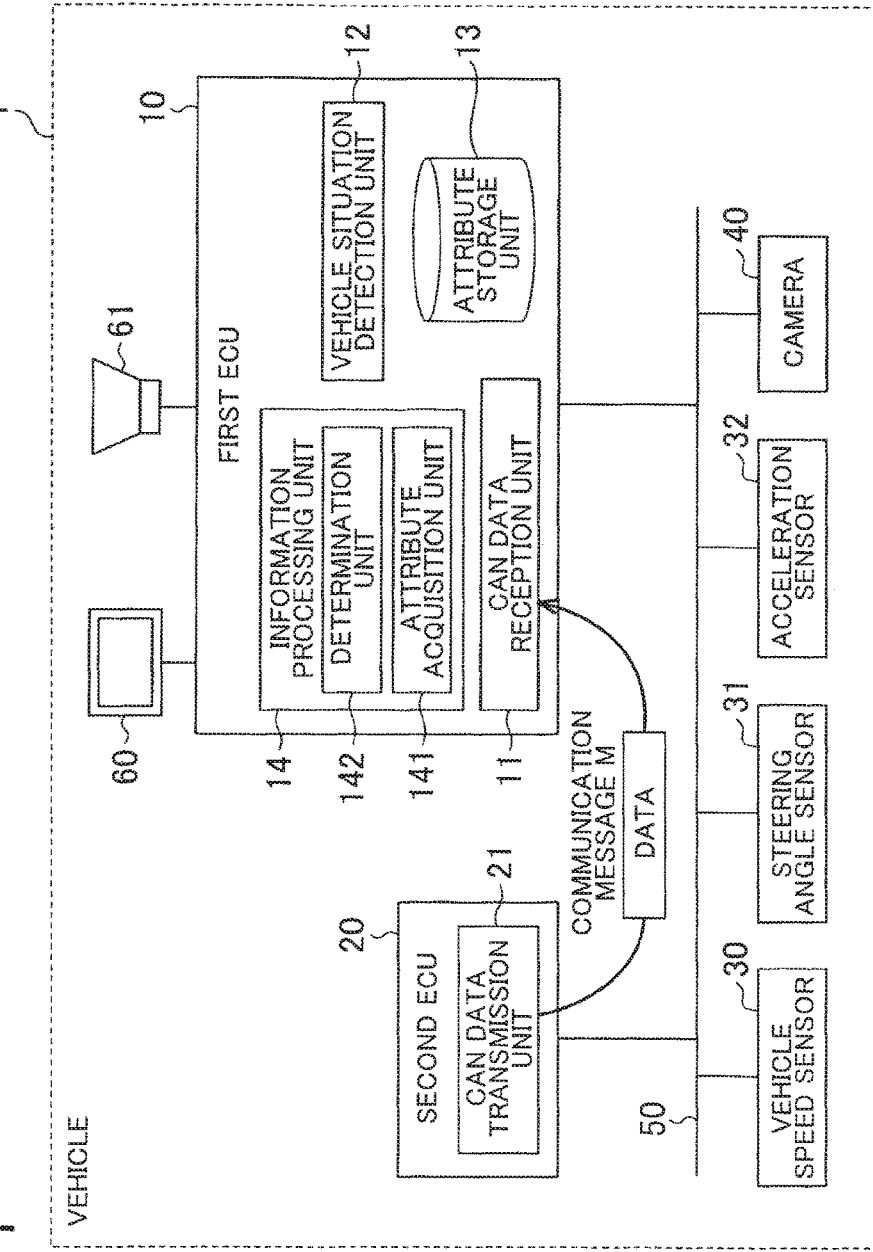
FIG. 1 is a block diagram showing the schematic configuration of a first embodiment of a communication system.

A first embodiment of a communication system according to the invention will be described referring to the drawings.

First, the outline of this embodiment will be described. As shown in FIG. 1, a vehicle 1 includes a communication system in which a first electronic control unit (ECU) 10 as a communication device, a second ECU 20 as a communication device, a vehicle speed sensor 30, a steering angle sensor 31, an acceleration sensor 32, and a camera 40 are communicably connected to a communication bus 50. Accordingly, the first and second ECUs 10, 20 can transmit and receive various kinds of data for control by transmission and reception of a communication message M. The first ECU 10 can receive various kinds of data transmitted from the vehicle speed sensor 30, the steering angle sensor 31, the acceleration sensor 32, and the camera 40. In this embodiment, the communication bus 50 is a bus for a controller area network (CAN), and a protocol which is applied to a communication message is a CAN protocol.

Figures 2, 3:
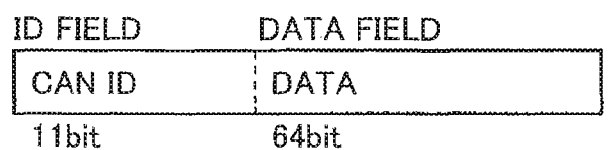
FIG. 2 is a schematic view illustrating the outline of a communication message for use in the communication system.
FIG. 3 is a list showing an example of a situation code in the communication system.

As shown in FIG. 2, the first ECU 10 includes a CAN data reception unit 11, and acquires "CAN ID" and "data" from the received communication message M in the CAN data reception unit 11.

As shown in FIG. 3, the first ECU 10 includes a vehicle situation detection unit 12, detects a vehicle situation based on various kinds of data received from the vehicle speed sensor 30, the steering angle sensor 31, the acceleration sensor 32, and the camera 40 in the vehicle situation detection unit 12, and acquires "situation code" according to the detected vehicle situation. A "situation code" is stored in the attribute storage unit 13 to correspond to a vehicle situation.

As shown in FIG. 4, the first ECU 10 includes an attribute acquisition unit 141 in an information processing unit 14, and creates a combination "CAN ID" and "situation code" in the attribute acquisition unit 141.

As shown in FIG. 5, the attribute acquisition unit 141 acquires an attribute corresponding to the created combination of "CAN ID" and "situation code" from an attribute stored in the attribute storage unit 13 to correspond to the combination. An attribute includes a plurality of elements, and for example, as the elements of the attribute, there are "category", "importance", "expiration date", and the like.

That is, as shown in FIG. 6, the attribute acquisition unit 141 creates a combination of "CAN ID" and "situation code" according to the received communication message M, and acquires an attribute corresponding to the created combination. Then, the acquired attribute is made to correspond to "data" acquired along with "CAN ID" from the communication message M.

Figure 7:
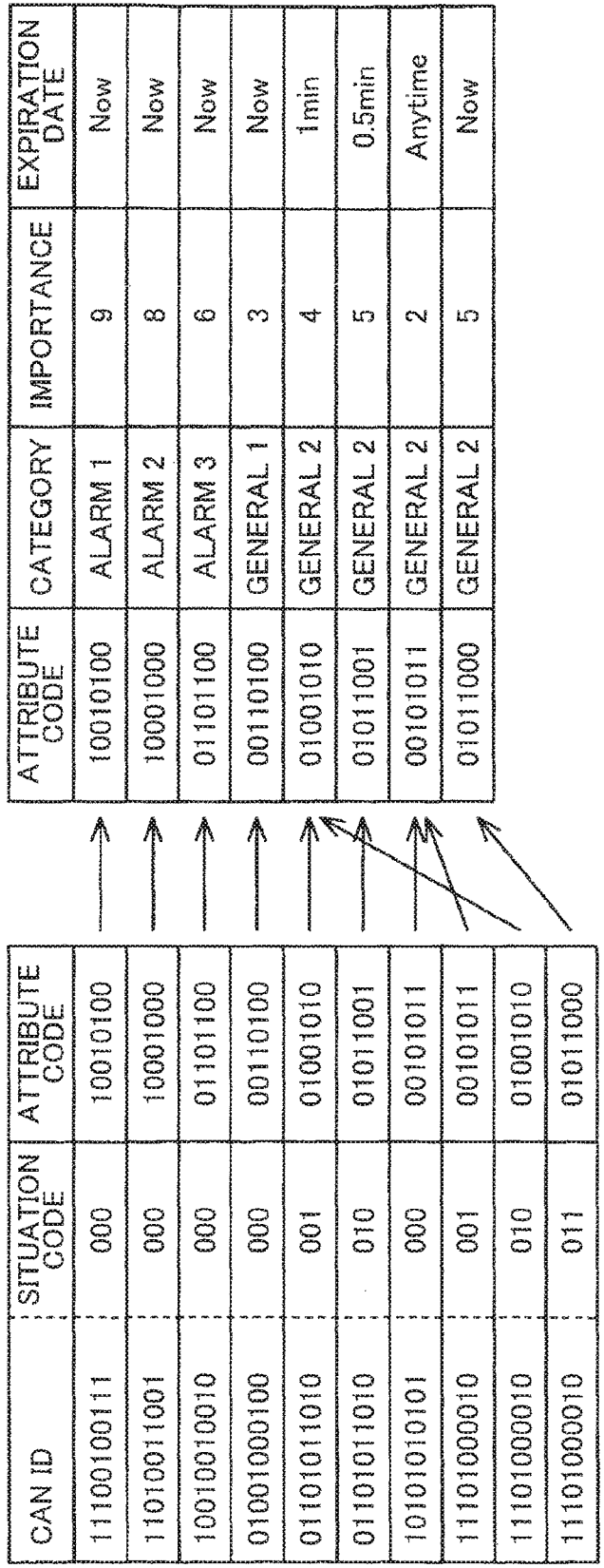
FIG. 7 is a list showing another example of a combination of an ID and a situation code and a corresponding attribute in the communication system.

As shown in FIG. 7, an attribute code may be given to each attribute, and a corresponding attribute code may be given to a combination of "CAN ID" and "situation code". With this, it is possible to acquire an attribute corresponding to a combination of "CAN ID" and "situation code" through an attribute code.

Figure 8:
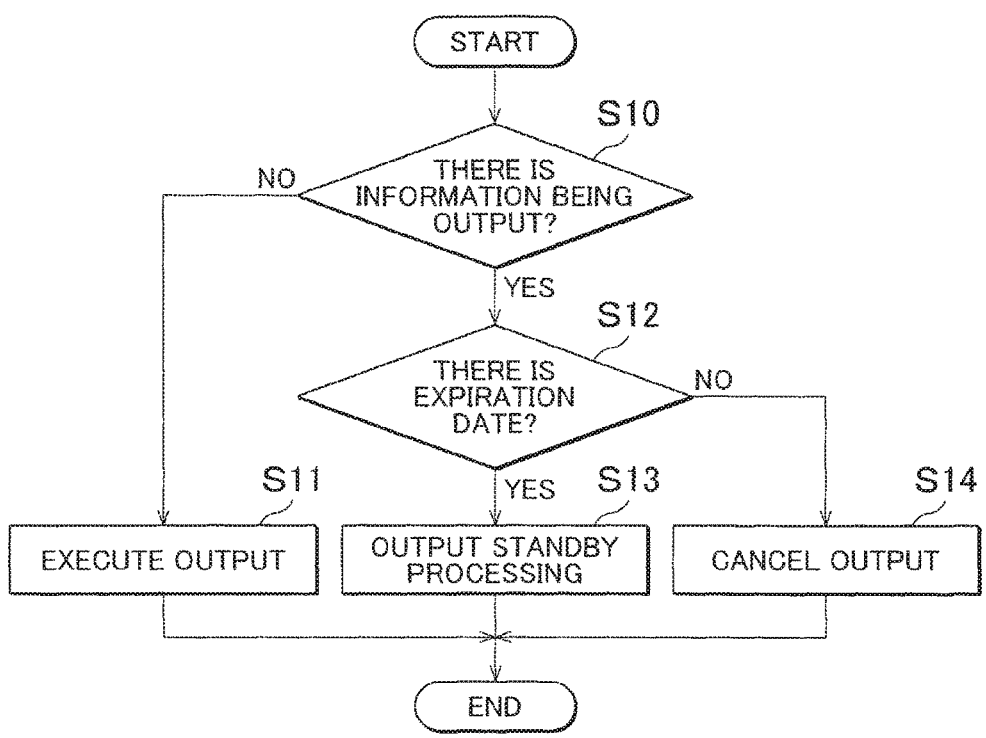
FIG. 8 is a flowchart showing a procedure when data processing of a communication message is performed based on an expiration date of an attribute in the communication system.

Then, as shown in FIG. 8, a determination unit 142 of the information processing unit 14 performs output processing for "data" to be processed based on the type of data specified by "CAN ID" and an attribute corresponding to "data".

Figure 9:
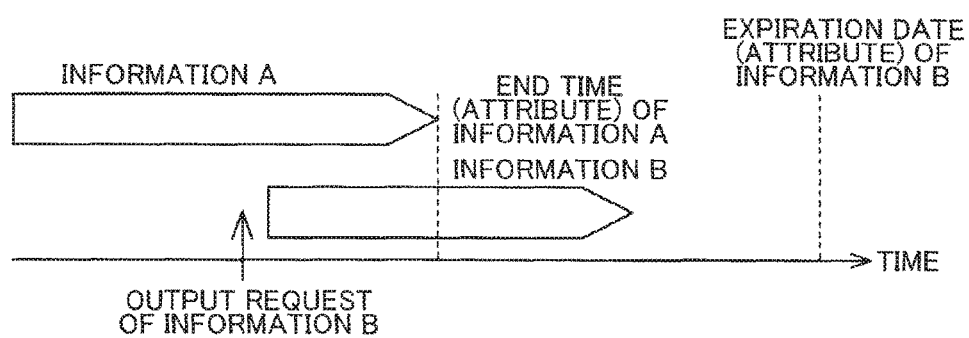
FIG. 9 is a schematic view showing an example where processing of data of a communication message is duplicated in the communication system.
Figure 10:
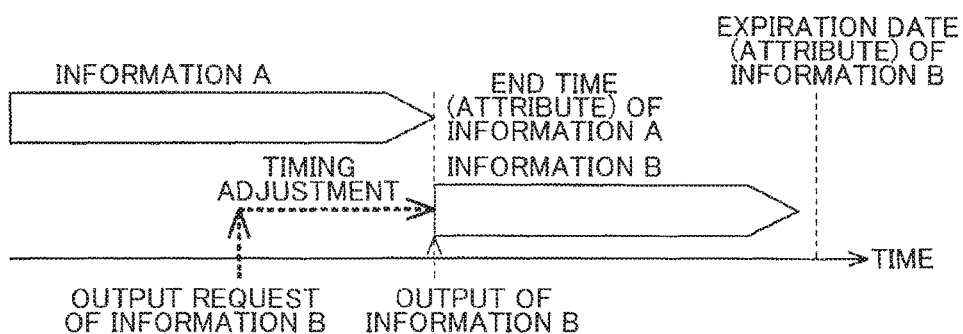
FIG. 10 is a schematic view showing an example where data of duplicate communication messages is processed in the communication system.

For example, as shown in FIGS. 9 and 10, the determination unit 142 performs, as the output processing, the adjustment of the output time of "attribute B", an output request of which is received, during the output of "attribute A".

Subsequently, the configuration of this embodiment will be described in detail. The vehicle 1 shown in FIG. 1 is a mobile object, such as an automobile. The vehicle 1 includes the communication system described above.

The communication bus 50 is constituted by a communication line or the like, such as a twisted cable, and transmits the communication message M which is one unit of communication in the CAN protocol through the communication line. The communication bus 50 may include wireless communication in a part of a communication path or may include a path which passes through another network through a gateway or the like. On the other hand, although the CAN protocol defines four frames as a frame which is the structure of a communication message, in this embodiment, it is assumed that a communication message is a data frame which is one of the frames and is able to store communication data designated by a user.

As shown in FIG. 2, the communication message M is provided with "ID field" in which "CAN ID" is stored, "data field" in which "data" designated by the user is stored, and the like. "CAN ID" has a value which is determined for each of the contents of data (information) included in the communication message M, and is a so-called identifier.

Here, "data" designated by the user refers to data which is not determined by the CAN protocol, and refers to arbitrary data to communicate. Arbitrary "data" to communicate includes data which is selected by predetermined processing of each ECU, a sensor, or the like, program processing for transmission according to conditions, or the like. Although the communication message M is provided with other fields, for convenience of description, description of other fields will be omitted. In the CAN protocol, "ID field" is set to a length of 11 bits, and "data field" is set to a byte length among 0 to 64 bits (8 bits×0 to 8 bytes). That is, the communication message M can include "data" designated by the user to a maximum of 64 bits.

The vehicle speed sensor 30 detects the rotation speed of the wheels of the vehicle 1 to calculate the speed of the vehicle 1 and outputs a signal according to the calculated speed to the first ECU 10 or the like through the communication bus 50. The steering angle sensor 31 detects the steering angle of the vehicle 1 and outputs a signal according to the detected steering angle to the first ECU 10 or the like through the communication bus 50.

The acceleration sensor 32 detects the acceleration of the vehicle 1 and outputs a signal according to the detected acceleration to the first ECU 10 or the like through the communication bus 50. The camera 40 images the ambient environment of the vehicle 1 and outputs a signal according to captured image data to the first ECU 10 or the like through the communication bus 50.

To the first ECU 10 are connected a display device 60 which is a device configured to output an image to be recognizable by the user, and a sound output device 61 which is a device configured to output sound to be recognizable by the user. The display device 60 is constituted by, for example, a screen or the like, such as a head-up display, a monitor of a navigation system, or a touch panel. The sound output device 61 is constituted by a device configured to output sound, such as a speaker or a buzzer. An image can include at least one of a still image and a motion image. Sound can include at least one of simple sound, such as alarm sound, and guide sound.

Each of the first and second ECUs 10, 20 is a control device which is used for various controls of the vehicle 1, and an ECU which has a driving system, a traveling system, a vehicle body system, or an information apparatus system as a control target. For example, an ECU which has a driving system as a control target is an ECU for an engine, an ECU which has a traveling system as a control target is an ECU for steering or an ECU for a brake, an ECU which controls a vehicle body system is an ECU for a light or an ECU for a window, and an ECU which has an information apparatus system as a control target is an ECU for car navigation.

Each of the first and second ECUs 10, 20 includes a microcomputer having an arithmetic unit and a storage unit. The arithmetic unit is a unit, such as a CPU, which executes arithmetic processing of control programs. The storage unit is constituted by a read-only memory (ROM) in which the control programs or data is stored, or a volatile memory (RAM) in which the arithmetic result of the arithmetic unit is temporarily stored, and also includes a nonvolatile storage medium, such as a hard disk or a flash memory (EEPROM), which can hold a large amount of data. Accordingly, each of the first and second ECUs 10, 20 reads the control programs or various parameters held in the storage unit to the arithmetic unit, and executes and processes the control programs or various parameters, thereby providing a predetermined function to a control target to control the control target.

In this embodiment, the first ECU 10 stores control programs for realizing the function of the vehicle situation detection unit 12 or the information processing unit 14, whereby the vehicle situation detection unit 12 or the information processing unit 14 is provided by the execution of the control programs. Similarly, the first ECU 10 may provide at least a part of the function of the CAN data reception unit 11 by the execution of a control program for realizing the function.

The second ECU 20 includes a CAN data transmission unit 21 which performs processing for creating the communication message M based on the CAN protocol in which "data" set by the user is included in the data field and for transmitting the communication message M. Here, "data" set by the user refers to various kinds of information relating to the control target of the second ECU 20, and includes "data" which is selected as a transmission target on a predetermined condition by program processing of the second ECU 20. The CAN data transmission unit 21 creates a communication message based on the CAN protocol based on "data" set by the user and "CAN ID" corresponding to "data" and transmits the communication message. That is, the communication message M created by the CAN data transmission unit 21 is transmitted to the communication bus 50 through a communication interface, called a CAN controller (not shown).

The CAN data reception unit 11 of the first ECU 10 receives the communication message M based on the CAN protocol and performs processing for extracting "CAN ID" or "data" from the received communication message M. The CAN data reception unit 11 outputs the extracted "CAN ID" or "data" in an aspect to be available by the information processing unit 14. Accordingly, the CAN data reception unit 11 extracts "CAN ID" or "data" from the communication message M transmitted from the second ECU 20 and allows "CAN ID" or "data" to be available by the information processing unit 14 or the like. The CAN data reception unit 11 extracts "CAN ID" or "data" from the communication message M transmitted from the vehicle speed sensor 30, the steering angle sensor 31, the acceleration sensor 32, and the camera 40 and allows "CAN ID" or "data" to be available by the vehicle situation detection unit 12 or the like.

The vehicle situation detection unit 12 detects the situation of the vehicle based on information acquired from various sensors, or the like and outputs the detection result to the information processing unit 14. The vehicle situation detection unit 12 acquires the signal according to the speed detected by the vehicle speed sensor 30, acquires the signal according to the steering angle detected by the steering angle sensor 31, the signal according to the acceleration detected by the acceleration sensor 32, and the signal according to image data captured by the camera 40. Then, the vehicle situation detection unit 12 detects that the vehicle situation is, for example, "normal traveling", "during right turn", "during left turn", or "high-speed traveling" based on whether or not detection conditions for detecting the situations are satisfied, and acquires "situation code" corresponding to the detected vehicle situation with reference to the attribute storage unit 13. The vehicle situation detection unit 12 outputs the acquired "situation code" in an aspect to be available by the information processing unit 14.

For example, the detection condition for detecting "normal traveling" is that the speed is equal to or lower than 60 km per hour, the steering angle is small, and the like. The detection condition for detecting "high-speed traveling" is that the speed exceeds 60 km per hour, the steering angle is small, and the like. The detection condition for detecting "during right turn" is that the speed is low and is equal to or lower than 30 km per hour and the steering angle is equal to or greater than 40 degrees to the right, and the detection condition for detecting "during left turn" is that the speed is low and is equal to or lower than 30 km per hour, the steering angle is equal to or greater than 40 degrees to the left, and the like. Although the above-described respective detection conditions do not include the acceleration detected by the acceleration sensor 32, the image processing result of the image captured by the camera 40, or the like, in order to improve detection precision, the respective detection conditions include conditions using information relating to the acceleration, a road shape obtained through image processing on the captured image, and information relating to a vehicle outside environment, such as an inter-vehicle distance from another vehicle, as necessary.

The attribute storage unit 13 is constituted by the whole or a part of a nonvolatile storage medium, such as a hard disk or a flash memory constituting the storage unit of the first ECU 10. The attribute storage unit 13 stores data required for processing for making an attribute correspond to "data" in the information processing unit 14. For example, the attribute storage unit 13 stores "identification code" corresponding to "CAN ID" of the communication message M, "situation code" corresponding to the vehicle situation, an attribute corresponding to a combination of "CAN ID" (identification code) and "situation code", and the like. In this embodiment, the same value as "CAN ID" is used as "identification code". That is, "identification code" matches "CAN ID". The attribute storage unit 13 may store "identification code" corresponding to "CAN ID", "situation code" corresponding to the vehicle situation, an attribute corresponding to a combination of "CAN ID" and "situation code", and the like as a list or a database in an aspect to be available by the information processing unit 14.

The information processing unit 14 performs various kinds of processing on data acquired from the communication message M. As described above, the information processing unit 14 includes the attribute acquisition unit 141 and the determination unit 142. The attribute acquisition unit 141 acquires "CAN ID" and "data" from the CAN data reception unit 11, and acquires "situation code" from the vehicle situation detection unit 12. It is assumed that "CAN ID" and "data" are acquired from one communication message M. At this time, it is preferable that "situation code" is acquired with a small time shift with respect to the acquisition time from the communication message M. For example, up-to-date "CAN ID", "data", and "situation code" may be acquired. Furthermore, "situation code" to be acquired may be determined in consideration of the update interval of "data" and the update interval of "situation code". For example, if the update interval of predetermined "data" is less than the update interval of "situation code", up-to-date "situation code" may be acquired, and if the update interval of predetermined "data" is equal to or greater than the update interval of "situation code", "situation code" at the time of update closest to the update time of the acquired "data" may be acquired.

The attribute acquisition unit 141 acquires an attribute according to a combination of "CAN ID" and "situation code" with reference to the attribute storage unit 13. For example, as shown in FIG. 5, when a combination of "CAN ID" and "situation code" is ""11001100110" "001"", it is possible to acquire an attribute in which the content of the category of the elements of the attribute is "general 2", the content of the importance of the elements of the attribute is "3", and the content of the expiration date of the elements of the attribute is "1 min".

As shown in FIG. 6, the attribute acquisition unit 141 can acquire parameters, such as "alarm 1", "alarm 2", "alarm 3", "general 1", and "general 2", as the content of the category of the elements of the attribute, and can acquire parameters, such as "9", "8", "6", "5", "4", "3", and "2", as the content of the importance of the elements of the attribute. The attribute acquisition unit 141 can acquire parameters, such as "Now" (now), "1 min" (for 1 minute), "0.5 min" (for 0.5 minute), and "Anytime" (anytime), as the content of the expiration date of the elements of the attribute.

The determination unit 142 outputs "data" of the communication message M to the display device 60 or the sound output device 61 on conditions determined in advance. When an attribute is made to correspond to "data", the determination unit 142 controls the output aspect of "data" based on the content of data specified by "CAN ID" and the attribute. That is, the determination unit 142 controls the output aspect of "data" according to the contents set in the respective elements of the attribute corresponding to "data", for example, in the category, the importance, the expiration date, and the like.

For example, as the output control according to the content of the category, the determination unit 142 performs output control of display output or sound output in an order of the contents "alarm 1", "alarm 2", "alarm 3", "general 1", and "general 2" in a noticeable aspect.

As the output control according to the importance, the determination unit 142 performs output control such that the output of "data" with high importance is given priority. For example, when output processing of a plurality of pieces of data is duplicated, the determination unit 142 may process "data" having high importance early. For example, when output processing of subsequent "data" is requested during output processing of previous "data", if importance of subsequent "data" is higher than importance of previous "data", the determination unit 142 may perform so-called interrupt processing in which the output processing of previous "data" is interrupted and the output processing of subsequent "data" is performed.

As the output control according to the expiration date, the determination unit 142 performs output control in which the output processing of "data" is adjusted to be executable until the expiration date, and when adjustment is impossible, the output processing is stopped. For example, the determination unit 142 may delay the execution start of the output processing when the end time of the output processing of "data" is within the expiration date, or may change the execution order with other kinds of information.

Here, information held in the attribute storage unit 13 will be described. As shown in FIG. 3, in the attribute storage unit 13, "situation code" corresponding to each vehicle situation is set. For example, in the attribute storage unit 13, "001" is set as "situation code" corresponding to the vehicle situation of "normal traveling", and "100" is set as "situation code" corresponding to the vehicle situation of "high-speed traveling". In the attribute storage unit 13, "010" is set as "situation code" corresponding to the vehicle situation of "during right turn", and "011" is set as "situation code" corresponding to the vehicle situation of "during left turn". Note that "000" is set as "situation code" corresponding to all vehicle situations.

As shown in FIG. 6, in the attribute storage unit 13, the relationship between a combination of "CAN ID" and "situation code", and an attribute corresponding to the combination is set. For example, in the attribute storage unit 13, an attribute in which the content of the category of the elements of the attribute is "alarm 1", the content of the importance of the elements of the attribute is "9", and the content of the expiration date of the elements of the attribute is "Now" is set corresponding to a combination of ""11100100111" "000"". In the attribute storage unit 13, an attribute in which the contents are "alarm 2", "8", and "Now" in the order of the above-described elements is set corresponding to a combination of ""11010011001" "000"", and an attribute in which the contents are "alarm 3", "6", and "Now" in the order of the above-described elements is set corresponding to a combination of ""10010010010" "000"". An attribute in which the contents are "general 1", "3", and "Now" in the order of the above-described elements is set for a combination of ""01001000100" "000"", and an attribute in which the contents are "general 2", "4", and "1 min" in the order of the above-described elements is set for a combination of ""01101011010" "001"". An attribute in which the contents are "general 2", "5", and "0.5 min" in the order of the above-described elements is set for a combination of ""01101011010" "010"", and the contents are "general 2", "2", and "Anytime" in the order of the above-described elements is set for a combination of ""10101010101" "000"". An attribute in which the contents are "general 2", "2", and "Anytime" in the order of the above-described elements is set for a combination of ""11101000010" "001"", and an attribute in which the contents of the above-described elements are "general 2", "4", and "1 min" is set for a combination of ""11101000010" "010"". An attribute in which the contents are "general 2", "5", and "Now" in the order of the above-described elements is set for a combination of ""11101000010" "011"".

As shown in FIG. 7, in the attribute storage unit 13, an attribute and a corresponding attribute code may be set, and a combination of "CAN ID" and "situation code" and a corresponding attribute code may be set. That is, an attribute corresponding to a combination of "CAN ID" and "situation code" may be made to correspond to the combination through an attribute code.

For example, in the attribute storage unit 13, an attribute code "10010100" is set to correspond to an attribute in which the contents of the category, the importance, and the expiration date of the elements of the attribute are "alarm 1", "9", and "Now" in this order, and an attribute code "10001000" is set to correspond to an attribute in which the contents are "alarm 2", "8", and "Now" in the order of the above-described elements. An attribute code "01101100" is set to correspond to an attribute in which the contents are "alarm 3", "6", and "Now" in the order of the above-described elements, and an attribute code "00110100" is set to correspond to an attribute in which the contents are "general 1", "3", and "Now" in the order of the above-described elements. An attribute code "01001010" is set to correspond to an attribute in which the contents are "general 2", "4", and "1 min" in the order of the above-described elements, and an attribute code "01011001" is set to correspond to an attribute in which the contents are "general 2", "5", and "0.5 min" in the order of the above-described elements. An attribute code "00101011" is set to correspond to an attribute in which the contents are "general 2", "2", and "Anytime" in the order of the above-described elements, and an attribute code "01011000" is set to correspond to an attribute in which the contents are "general 2", "5", and "Now" in the order of the above-described elements.

As shown in FIG. 7, an attribute code "10010100" is set to correspond to a combination ""11100100111" "000"" of "CAN ID" and "situation code", and an attribute code "10001000" is set to correspond to an attribute selection identifier ""11010011001" "000"". An attribute code "01101100" is set to correspond to the above-described combination ""10010010010" "000"", and an attribute code "00110100" is set to correspond to the above-described combination ""01001000100" "000"". An attribute code "01001010" is set to correspond to the above-described combination ""01101011010" "001"", and an attribute code "01011001" is set to correspond to the above-described combination ""01101011010" "010"". An attribute code "00101011" is set to correspond to the above-described combination ""10101010101" "000"", and an attribute code "00101011" is set to correspond to the above-described combination ""11101000010" "001"". An attribute code "01001010" is set to correspond to the above-described combination ""11101000010" "010"", and an attribute code "01011000" is set to correspond to the above-described combination ""11101000010" "011"".

That is, the attribute code may be obtained from the combination of "CAN ID" and "situation code" with reference to the attribute storage unit 13, and the attribute corresponding to the obtained attribute code may be selected.

Next, an example of output processing for outputting "data" obtained from the communication message M by the first ECU 10 will be described. The output processing is executed according to the end of making the attribute correspond to "data". Note that "data" subject to the output processing is provided as "information" from the display device 60 or the sound output device 61 to the user. Hereinafter, description will be provided assuming that "data" is "information" which is provided to the user.

As shown in FIG. 8, if output processing of "new information" based on "data" starts, the determination unit 142 of the information processing unit 14 performs determination about whether or not there is "information being output" to the display device 60 or the sound output device 61 (Step S10 of FIG. 8). When it is determined that there is no "information being output" (NO in Step S10 of FIG. 8), the determination unit 142 executes the output of "new information" from the display device 60 or the sound output device 61 (Step S11 of FIG. 8) and ends the output processing according to the completion of the execution of the output.

When it is determined that there is "information being output" (YES in Step S10 of FIG. 8), the determination unit 142 performs determination about whether or not the expiration date is included in the elements of the attribute corresponding to "new information" (Step S12 of FIG. 8). When it is determined that the expiration date is not included in the elements of the attribute (NO in Step S12 of FIG. 8), the determination unit 142 cancels the output of "new information" (data) (Step S14 of FIG. 8). Then, the output processing ends.

When it is determined that the expiration date is included in the elements of the attribute (YES in Step S12 of FIG. 8), the determination unit 142 executes processing for making the output stand by based on the expiration date of "new information" (Step S13 of FIG. 8). Then, if the processing for making the output stand by ends, and the executed output processing or the like ends, the output processing ends.

Here, the processing (Step S13 of FIG. 8) for making the output stand by will be described. As shown in FIG. 9, the information processing unit 14 receives the communication message M while "information A" is output to the display device 60, whereby an output request of "information B" to the display device 60 occurs. At this time, if "information A" and "information B" can be output simultaneously on the screen of the display device 60 in different display aspects, it is possible to make "information A" and "information B" be displayed simultaneously on the display device 60. However, when a plurality of pieces of information are displayed simultaneously, recognizability of the user to these kinds of information may be degraded, and the time necessary for recognition may be extended. When "information A" and "information B" are in the same display aspect and interfere with each other on the screen of the display device 60, it is not preferable to make two pieces of information be output simultaneously on the screen of the display device 60. When "information A" and "information B" are sound, if two kinds of sound overlap each other, even though the two kinds of sound are different in tone, the user ability to hear the sound output of these kinds of information is difficult.

Accordingly, as shown in FIG. 10, when an output request of "information B" to the display device 60 occurs while "information A" is output to the display device 60, the determination unit 142 of the information processing unit 14 calculates the end time of the output of "information A" from the attribute or the like of "information A". If "output period" is included in the attribute, the end time of the output of "information A" can be calculated from the attribute. Even though "output period" is not included in the attribute of "information A", the output period can be calculated from "output period" or the like determined by normal processing of the display device 60.

The determination unit 142 of the information processing unit 14 calculates the output period of "information B" from the attribute and the like of "information B". If "output period" is included in the attribute, the output period of "information B" can be calculated from the attribute. Even though "output period" is not included in the attribute of "information B", the output period may be calculated from "output period" or the like determined by normal processing of the display device 60. Then, when "information B" is output for "output period" from the end time of the output of "information A", the determination unit 142 estimates the output end time at which the output of "information B" ends. The determination unit 142 performs determination about whether or not the estimated output end time is before the expiration date included in the attributed of "information B". Then, when it is determined that the output end time of "information B" is within the expiration date, timing adjustment is performed to delay the output start time of "information B" to the end time of the output of "information A". With this, it is possible to prevent the interference of the outputs of "information A" and "information B".

When it is determined that the output end time of "information B" exceeds the expiration date, it is not possible to delay the output start time of "information B" to the end time of the output of "information A". At this time, the determination unit 142 outputs "information A" and "information B" simultaneously, interrupts the output of "information B", or stops the output of "information B".

Figure 11:
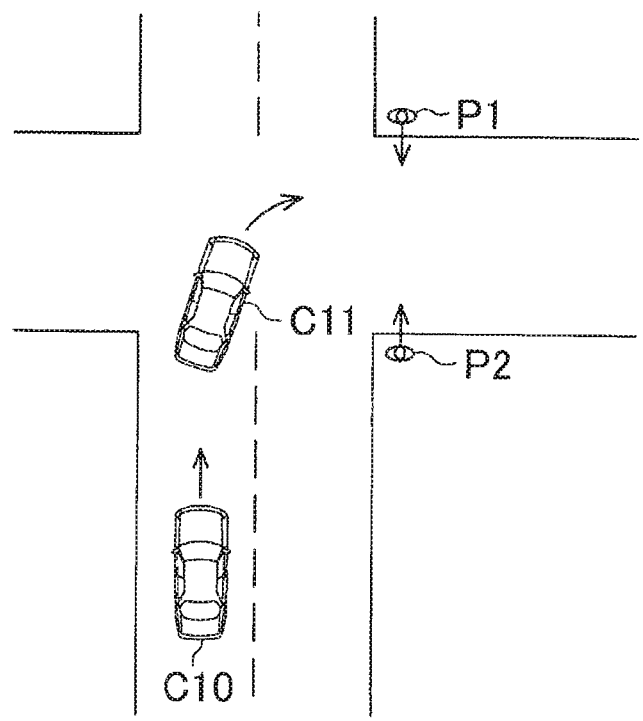
FIG. 11 is a schematic view showing an example where a vehicle situation is given to data and a different attribute for each vehicle situation is acquired in the communication system.

Next, an application example of this embodiment will be described referring to FIGS. 11 to 13. As shown in FIG. 11, a vehicle C10 during normal traveling (during straight traveling) detects pedestrians P1, P2 who cross a right crossroad, and "data" representing that the pedestrians P1, P2 who cross the right crossroad are detected is transmitted to the first ECU 10 through the communication message M. Then, the first ECU 10 acquires an attribute from "CAN ID" of the communication message M and "situation code" corresponding to normal traveling detected as a vehicle situation. At this time, in an attribute corresponding to the relationship between "information of the pedestrians who cross the right crossroad" and "during straight traveling", importance at normal level is set in the content of the element.

A vehicle C11 during right turn detects the pedestrians P1, P2 who cross the right crossroad and "data" representing the detection of the pedestrians P1, P2 crossing the right crossroad is transmitted to the first ECU 10 through the communication message M. Then, the first ECU 10 acquires an attribute from "CAN ID" of the communication message M" and "situation code" corresponding to right turn detected as a vehicle situation. At this time, in an attribute corresponding to the relationship between "information of the pedestrians who cross the right crossroad" and "during right turn", importance at high level, for example, at warning level is set in the content of the element.

Accordingly, the information processing unit 14 makes an attribute according to a vehicle situation correspond to "data" obtained from the communication message M having the same "CAN ID", whereby high-function processing of "data" is achieved. That is, it is possible to use information (attribute) required for improvement of convenience along with communication data while suppressing an increase in the amount of communication data.

Figure 12:
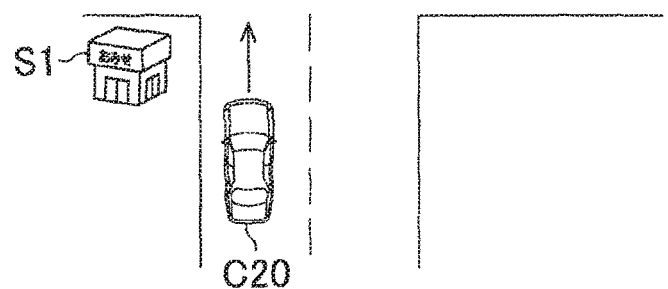
FIG. 12 is a schematic view showing an example where a vehicle situation is given to data and the same attribute for each vehicle situation is acquired in the communication system.

As shown in FIG. 12, "data" representing that a vehicle C20 during normal traveling near an intersection detects a store S1 near a crossroad, a store S2 on the left side of the intersection, and a store S3 on the right side of the intersection is transmitted to the first ECU 10 through the communication message M. At this time, the first ECU 10 acquires an attribute corresponding to "data" from "CAN ID" of the communication message M and "situation code" corresponding to normal traveling detected as a vehicle situation. At this time, when the traveling direction of the vehicle C20 at the intersection is not clear, in an attribute corresponding to the relationship between "information of the respective stores S1 to S3 around the crossroad" and "vehicle C20 is during normal traveling", importance at normal level is set. That is, an attribute having importance at normal level is made to correspond to information of the respective stores S1 to S3.

Figure 13:
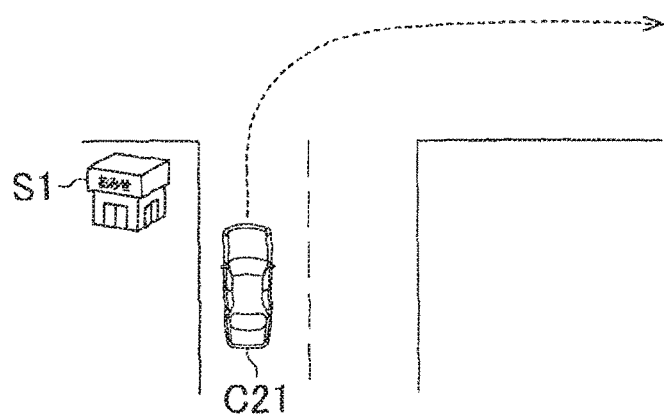
FIG. 13 is a schematic view showing another example where a vehicle situation is given to data and a different attribute for each vehicle situation is acquired in the communication system.

As shown in FIG. 13, in a vehicle C21 which is predicted to turn right at the intersection, "data" representing the detection of the above-described three stores S1 to S3 is transmitted to the first ECU 10 through the communication message M. At this time, the first ECU 10 acquires an attribute from "CAN ID" of the communication message M and "situation code" corresponding to right turn prediction detected as a vehicle situation. At this time, in an attribute corresponding to the relationship between "information of the store S1 near the crossroad" and "information of the store S3 on the right side of the crossroad", and "vehicle situation in which right turn is predicted", importance at normal level is set in the content of the attribute. In an attribute corresponding to the relationship between "the store S2 on the left side of the crossroad" and "vehicle situation in which right turn is predicted", importance at lower level than normal level is set in the content of the element.

Accordingly, in case of "data" obtained from "CAN ID" at the same level, information of the store S1 near the crossroad and the store S3 on the right side of the crossroad is allocated with priority relatively higher than the store S2 on the left side of the crossroad. An attribute according to a vehicle situation is made to correspond to information obtained by the same "CAN ID".

That is, a communication system capable of using information required for improvement of convenience along with communication data while suppressing an increase in the amount of communication data is provided. As described above, the communication system of this embodiment has the following effects.

(1) The attribute according to the vehicle situation, such as the vehicle state of the vehicle 1 or the vehicle outside environment, is made to correspond to the received communication message M. That is, the attribute is made to correspond to the communication message M without changing the communication message M. Accordingly, the attribute is made to correspond to the communication message M without increasing the amount of communication of the communication message M or the like. The communication message M is processed based on the attribute, whereby it is possible to suitably process any communication message with a limited amount of data.

(2) It is possible to detect the vehicle state, such as "normal traveling", "during right turn", "during left turn", or "high-speed traveling", which is the state of the vehicle as one of the vehicle situations, and to make the attribute according to the detected vehicle state correspond to the communication message M.

(3) The "identification code" is used as the identifier "CAN ID" of the communication message M, making it easy to set the identification code. That is, "CAN ID" for use in communication with a CAN bus is determined to have a unique value for each type of data included in a communication message, making it easy to make "identification code" be different for each communication message.

(4) Since there are a lot of data to which the same attribute is allocated, the same attribute is made to correspond to a plurality of pieces of data through attribute codes, whereby it is possible to suppress the amount of data having the attributes stored in the attribute storage unit 13. In this case, while the attribute codes are required instead of the attributes, the amount of data of the attribute codes is made smaller than the amount of data of the attributes, thereby suppressing the storage capacity required for the attribute storage unit 13.

(5) The expiration date is made to correspond to data, whereby it is possible to process data until the expiration date. When data is unable to be processed until the expiration date, data is not processed. In this way, it is possible to perform processing according to the expiration of the expiration date. For example, in case of data output to a driving assistance device, it is possible to reduce a sense of discomfort of the user on information provision, for example, it is possible to provide data at the right time and to prevent inopportune data provision.

(6) When a plurality of pieces of data are received, it is possible to adjust the output time according to the expiration date of data. For example, when subsequent data is received during processing of data received previously, in regards to a processing aspect of data received subsequently, it is possible to determine an appropriate aspect in consideration of the expiration date of data. With this, user convenience or recognition property is increased, and for example, it is possible to appropriately output a plurality of pieces of data at the right time.

(7) The "situation code" is acquired with a small time shift with respect to the acquisition time from the communication message M. That is, the vehicle situation is acquired from the vehicle situation detection unit 12 according to the reception of the communication message M, whereby it is possible to make an appropriate attribute to data of the received communication message.

(8) It is possible to make the attribute according to the vehicle situation correspond to the communication message M using the CAN bus having the restriction of the amount of data. Making the attribute correspond to the communication message M is performed without changing the allocation of "CAN ID" to the communication message M, and thus this is easily applied.

Second Embodiment

A second embodiment of a communication system according to the invention will be described referring to FIGS. 14 to 18.

This embodiment has a configuration different from the configuration in the first embodiment in that a plurality of kinds of data is included in one communication message, and other configurations are the same as those in the first embodiment. Accordingly, while a configuration different from the first embodiment will be primarily described below, the same configurations as those in the first embodiment are represented by the same reference numerals, and for convenience of description, detailed description thereof will be omitted.

As shown in FIG. 14, data corresponding to "information A", "information B", and "information C" is included in the data field of the communication message M having predetermined "CAN ID". For example, data corresponding to "information A" is stored from the first bit to the sixth bit of the data field, data corresponding to "information B" is stored from the 13th bit to 20th bit of the data field, and data corresponding to "information C" is stored in the 56th bit of the data field. An ECU or the like which transmits or receives the communication message M having the predetermined "CAN ID" sets the predetermined "CAN ID" and the positions of data corresponding to "information A", "information B", and "information C" included in the communication message M of "CAN ID" in advance. For example, the CAN data reception unit 11 of the first ECU 10 sets the predetermined "CAN ID", the position of data corresponding to "information A" in the first to sixth bits, the position of data corresponding to "information B" in the 13th to 20th bits, and the position of data corresponding to "information C" in the 56th bit.

As shown in FIG. 15, in the attribute storage unit 13, a position code corresponding to the first to sixth bits of the data field is set to "000000", and a position code corresponding to the 13th to 20th bits of the data field is set to "001100". In the attribute storage unit 13, a position code corresponding to the 56th bit of the data field is set to "111000".

As shown in FIG. 16, the attribute acquisition unit 141 of the information processing unit 14 creates a combination of "CAN ID" and "position code" corresponding to "data" and "situation code" corresponding to a vehicle situation. In this embodiment, this combination has 20 bits in total of 11 bits of "CAN ID", 6 bits of "position code", and 3 bits of "situation code".

Then, as shown in FIG. 17, the attribute acquisition unit 141 acquires an attribute corresponding to the created combination. For example, ""11001100110" "000000" "001"" is created as the combination of "CAN ID", "position code", and "situation code", and an attribute in which the content of the category of the elements of the attribute is "general 2", the content of the importance of the elements of the attribute is "3", and the content of the expiration date of the elements of the attribute is "1 min" is acquired as the attribute corresponding to the combination. Then, the acquired attribute is made to correspond to "data" obtained from the position of "position code" of the data field of the communication message M, and the corresponding attribute is used for the output processing of "data" along with "CAN ID".

Here, information held in the attribute storage unit 13 will be described. As shown in FIG. 18, in this embodiment, the attribute storage unit 13 sets the relationship between the combination of "CAN ID", "position code", and "situation code", and the attribute corresponding to the combination.

For example, in the attribute storage unit 13, an attribute in which the content of the category of the elements of the attribute is "alarm 1", the content of the importance is "9", and the content of the expiration date is "Now" is set corresponding to a combination of ""11100100111" "011000" "000"". An attribute in which the contents are "alarm 2", "8", and "Now" in the above-described order is set corresponding to a combination of ""11010011001" "000110" "000"", and an attribute in which the contents are "alarm 3", "6", and "Now" in the above-described order is set corresponding to a combination of ""10010010010" "001110" "000"". An attribute in which the contents are "general 1", "3", and "Now" in the above-described order is set corresponding to a combination of ""01001000100" "000101" "000"", and an attribute in which the contents are "general 2", "4", and "1 min" in the above-described order is set corresponding to a combination of ""01101011010" "001100" "001"". An attribute in which the contents are "general 2", "5", and "0.5 min" in the above-described order is set corresponding to a combination of ""01101011010" "001100" "010"", and an attribute in which the contents are "general 2", "2", and "Anytime" in the above-described order is set corresponding to a combination of ""10101010101" "000011" "000"". An attribute in which the contents are "general 2", "2", and "Anytime" in the above-described order is set corresponding to a combination of ""11101000010" "000000" "001"", and an attribute in which the contents are "general 2", "4", and "1 min" in the above-described order is set corresponding to a combination of ""11101000010" "000000" "010"". An attribute in which the contents are "general 2", "5", "Now" in the above-described order is set corresponding to a combination of ""11101000010" "000000" "011"".

According to this embodiment, in order to suppress an increase in the amount of communication data, even when a plurality of pieces of data are included in a communication message, it is possible to use information (attribute) required for improvement of convenience along with communication data while suppressing an increase in the amount of communication data.

As described above, the communication system of this embodiment has the following effect, in addition to the effects of (1) to (8) described in the first embodiment. (9) For the communication message M in which a plurality of pieces of data are stored, it is possible to specify data, to acquire an appropriate attribute for each piece of data, and to associate the attribute with data.

Third Embodiment

A third embodiment of a communication system according to the invention will be described referring to FIGS. 19 to 21.

This embodiment has a configuration different from the configuration in the first embodiment in that data of a communication message is arranged in a memory, and other configurations are the same as those in the first embodiment. Accordingly, while a configuration different from the first embodiment will be primarily described below, the same configurations as those in the first embodiment are represented by the same reference numerals, and for convenience of description, detailed description thereof will be omitted.

Figure 19:
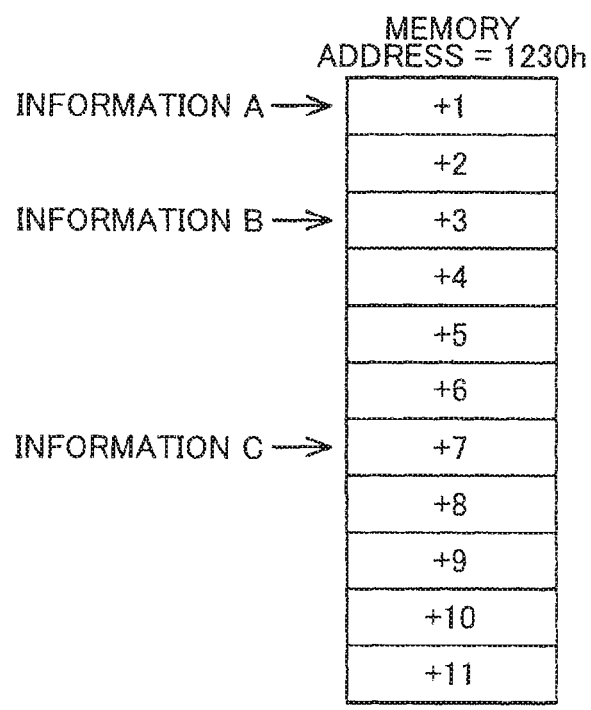
FIG. 19 is a schematic view schematically showing the structure of an address of a memory, in which data of a communication message is held, in a third embodiment of a communication system.

As shown in FIG. 19, the CAN data reception unit 11 of the first ECU 10 writes data included in the communication message M in an address determined in advance of a storage unit (RAM or the like) as a data storage unit to be readable by the information processing unit 14 according to the reception of the communication message M. An address specifies a memory area of the storage unit. For example, the CAN data reception unit 11 arranges data corresponding to "information A", "information B", and "information C" acquired from the communication message M in a memory address area. For example, data corresponding to "information A" is arranged in an address "1231h", data corresponding to "information B" is arranged in an address "1233h", and data corresponding to "information C" is arranged in an address "1237h". Note that "h" represents a hexadecimal number. For convenience of description, the value of an address is represented by a hexadecimal number. An address is determined in advance for each type of data to be stored therein.

Figure 20:
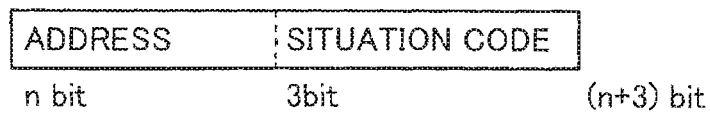
FIG. 20 is a schematic view showing a combination aspect of an address of a memory and a situation code in the communication system.

As shown in FIG. 20, in this embodiment, "address" is used as "identification code". That is, the attribute acquisition unit 141 of the information processing unit 14 creates a combination of "address" corresponding to "data" and "situation code" corresponding to a vehicle situation. In this embodiment, this combination has (n+3) bits in total of n (where n is an integer) bits of "address" and 3 bits of "situation code".

Then, as shown in FIG. 21, the attribute acquisition unit 141 acquires an attribute corresponding to the created combination. For example, ""1231h" "001"" is created as the combination of "address" and "situation code", and an attribute in which the content of the category of the elements is "general 2", the content of the importance of the elements is "3", and the content of the expiration date of the elements is "1 min" is acquired as the attribute corresponding to the combination. Then, the acquired attribute is made to correspond to "data" obtained from "address", and the corresponding attribute is used for processing of "data".

As described above, the communication system of this embodiment has the following effect, in addition to the effects of (1), (2), and (4) to (8) described in the first embodiment. (10) The identification code is determined to correspond to the address of the memory in which "data" of the communication message M is held, making it easy to set the identification code. For example, the address of the memory can be used as the identification code as it is. Since an address is determined to be different according to "data", it becomes easy to make "identification code" be different according to data.

Fourth Embodiment

A fourth embodiment of a communication system according to the invention will be described referring to FIGS. 22 to 24.

This embodiment has a configuration different from the configuration in the third embodiment in that an address of a memory in which data is arranged is specified by a position code, and other configurations are the same as those in the third embodiment. Accordingly, while a configuration different from the third embodiment will be primarily described below, the same configurations as those in the third embodiment are represented by the same reference numerals, and for convenience of description, detailed description thereof will be omitted.

As shown in FIG. 22, in the attribute storage unit 13, a position code corresponding to the second byte of the address "1230h" in which data corresponding to "information A" is arranged is set to "000001", and a position code corresponding to the fourth byte in which data corresponding to "information B" is arranged is set to "000011". In the attribute storage unit 13, a position code corresponding to the eighth byte of the address "1230h" in which data corresponding to "information C" is arranged is set to "000111".

As shown in FIG. 23, the attribute acquisition unit 141 of the information processing unit 14 creates a combination of "address" and "position code" corresponding to "data" and "situation code" corresponding to a vehicle situation. In this embodiment, this combination has (n+9) bits in total of n (where n is an integer) bits of "address", 6 bits of "position code", and 3 bits of "situation code".

Then, as shown in FIG. 24, the attribute acquisition unit 141 acquires an attribute corresponding to the created combination. For example, ""1230h" "000001" "001"" is created as the combination of "address", "position code", and "situation code", and an attribute in which the content of the category of the elements is "general 2", the content of the importance of the elements is "3", and the content of the expiration date of the elements is "1 min" is acquired as the attribute corresponding to the combination. Then, the acquired attribute is made to correspond to "data" obtained from "address", and the corresponding attribute is used for processing of "data".

As described above, the communication system of this embodiment has the following effect, in addition to the effects of (1), (2), and (4) to (8) described in the first embodiment and the effect of (10) described in the third embodiment.

(11) It is possible to specify data acquired from a communication message regardless of an arrangement aspect of a plurality of pieces of data into a memory, to acquire an appropriate attribute according to data, and to associate the attribute with data.

Fifth Embodiment

A fifth embodiment of a communication system according to the invention will be described referring to FIGS. 25 to 31.

This embodiment has a configuration different from the configuration in the first embodiment in that, even though an identifier of a communication message is the same, and data corresponding to the identifier is different for each vehicle type, an appropriate attribute can be made to correspond to data, and other configurations are the same as those in the first embodiment. Accordingly, while a configuration different from the first embodiment will be primarily described below, the same configurations as those in the first embodiment are represented by the same reference numerals, and for convenience of description, detailed description thereof will be omitted.

In this embodiment, a configuration in which the same attribute is made to corresponding to a predetermined number of pieces of data of similar type for two vehicles of "vehicle type A" and "vehicle type B" will be described. On the other hand, in each of the communication messages of "vehicle type A" and "vehicle type B", the arrangement positions of a predetermined number of pieces of data of similar type in the data field are different. Accordingly, a configuration in which, even though the arrangement positions of a predetermined number of pieces of data of similar type are different in a plurality of vehicle types or the like, the same attribute can be made to correspond to a predetermined number of pieces of data of similar type will be described.

As shown in FIG. 25, in each of the attribute storage unit 13 of the vehicle of "vehicle type A" and the attribute storage unit 13 of the vehicle of "vehicle type B", the same common database 131 is held. In the common database 131, an attribute and a conversion code corresponding to the attribute are set to correspond to each other. In all vehicle types, in general, since the same attribute can be made to correspond to a predetermined number of pieces of data of similar type, the common database 131 can be shared among a plurality of vehicle types. Then, the common database is shared among different vehicle types, making it easy to set an attribute to data for various vehicle types.

In this embodiment, for example, in the common database 131, "attribute of information A", "attribute of information B", a conversion code ""11001100110" "000001" "001"" corresponding to "attribute of information A", and a conversion code ""11001100110" "001101" "001"" corresponding to "attribute of information B" are set. Accordingly, for any of "vehicle type A" and "vehicle type B", it is possible to make an attribute correspond to data acquired from the communication message M through a conversion code.

In this embodiment, although a conversion code is unique to each attribute, and thus the configuration of the conversion code is a combination of "CAN ID", "position code", and "situation code", any configuration may be determined insofar as a conversion code can be made to be unique to each attribute.

Hereinafter, a configuration in which an attribute is made to correspond to data acquired from the communication message M using the common database 131 will be described in detail. First, a configuration in the vehicle of "vehicle type A" will be described.

As shown in FIG. 26, in "vehicle type A", the data field of the communication message M having predetermined "CAN ID" includes data corresponding to "information A" in the first to eighth bits, data corresponding to "information B" in the 13th to 20th bits, and data corresponding to "information C" in the 56th bit.

As shown in FIG. 27, in the attribute storage unit 13, a position code corresponding to the first to eighth bits of the data field is set to "000001", and a position code corresponding to the 13th to 20th bits of the data field is set to "001101". In the attribute storage unit 13, a position code corresponding to the 56th bit of the data field is set to "111000" (not shown).

The attribute acquisition unit 141 of the information processing unit 14 creates a combination of "CAN ID" and "position code" corresponding to "data" and "situation code" corresponding to a vehicle situation. That is, ""11001100110" "000001" "001"" is created as a combination corresponding to "information A", and ""11001100110" "001101" "001"" is created as a combination corresponding to "information B".

As shown in FIG. 28, in the attribute storage unit 13, "conversion code" corresponding to each of the created combinations is set. Accordingly, the attribute acquisition unit 141 selects conversion codes corresponding to the combinations created in the above-described manner with reference to the attribute storage unit 13. In this embodiment, in "vehicle type A", the combination created in the above-described manner and "conversion code" have the same code. Then, the attribute acquisition unit 141 makes "attribute for information A" correspond to data of "information A" and makes "attribute for information B" correspond to data of "vehicle type B" through "conversion code" with reference to the common database 131.

Subsequently, a configuration in the vehicle of "vehicle type B" will be described. As shown in FIG. 29, in "vehicle type B", the data field of the communication message M having predetermined "CAN ID" includes data corresponding to "information B" in the first to eighth bits, data corresponding to "information A" in the 13th to 20th bits, and data corresponding to "information C" in the 56th bit.

As shown in FIG. 30, in the attribute storage unit 13, a position code corresponding to the first to eighth bits of the data field is set to "000001", and a position code corresponding to the 13th to 20th bits of the data field is set to "001101". In the attribute storage unit 13, a position code corresponding to the 56th bit of the data field is set to "111000" (not shown).

The attribute acquisition unit 141 of the information processing unit 14 creates a combination of "CAN ID" and "position code" corresponding "data" and "situation code" corresponding to a vehicle situation. That is, ""11001100110" "001101" "001"" is created as a combination corresponding to "information A", and ""11001100110" "000001" "001"" is created as a combination corresponding to "information B".

As shown in FIG. 31, in the attribute storage unit 13, "conversion code" corresponding to each of the created combinations is set. Accordingly, the attribute acquisition unit 141 selects conversion codes corresponding to the combinations created in the above-described manner with reference to the attribute storage unit 13. In this embodiment, in "vehicle type B", ""11001100110" "000001" "001"" is set as "conversion code" for the combination ""11001100110" "001101" "001"" corresponding to data of "information A". ""11001100110" "001101" "001"" is set as "conversion code" for the combination ""11001100110" "000001" "001"" corresponding to data of "information B".

Then, the attribute acquisition unit 141 makes "attribute for information A" correspond to data of "information A" and makes "attribute for information B" correspond to data of "vehicle type B" through "conversion code" with reference to common database 131.

According to this embodiment, for any of "vehicle type A" and "vehicle type B", it becomes possible to acquire an attribute corresponding to each piece of data among the attributes set in the common database based on "conversion code" prepared according to the respective vehicle types. With this, it is possible to suitably make an attribute correspond to data included in the communication message M regardless of the type of vehicle or the like.

As described above, the communication system of this embodiment has the following effect, in addition to the effects of (1) to (8) described in the first embodiment. (12) A conversion code is made to correspond to a combination of "CAN ID", "position code", and "situation code" obtained by each of a plurality of vehicle types, whereby it is possible to acquire an attribute from the common database 131 which is provided in common to a plurality of vehicle types.

Other Embodiments

The respective embodiments may be carried out in the following aspects. In the respective embodiments, a case where the first ECU 10 includes the CAN data reception unit 11, the vehicle situation detection unit 12, the attribute storage unit 13, and the information processing unit 14 has been illustrated. However, the invention is not limited thereto. The first ECU is not limited to the above-described configuration and may have any configuration insofar as an attribute can be given to data of a received communication message according to a vehicle situation. With this, improvement of the degree of freedom for design of a communication system is achieved.

In the respective embodiments, a case where the first and second ECUs 10, 20 are connected to the communication bus 50 and the vehicle speed sensor 30, the steering angle sensor 31, the acceleration sensor 32, and the camera 40 are connected to the communication bus 50 has been illustrated. However, the invention is not limited thereto. Three or more ECUs may be connected to a communication bus and other sensors, various devices, a gateway, and the like may be connected to the communication bus. At least one of the vehicle speed sensor, the steering angle sensor, the acceleration sensor, and the camera may not be connected. With this, the expansion of the application range of a communication system is achieved.

In the respective embodiments, a case where the detection condition of "normal traveling" is that the speed is equal to or lower than 60 km per hour and the steering angle is small, and the detection condition of "high-speed traveling" is that the speed exceeds 60 km per hour and the steering angle is small has been illustrated. A case where the detection condition of "during right turn" is that the speed is equal to or lower than 30 km per hour and the steering angle is equal to or greater than 40 degrees to the right, and the detection condition of "during left turn" is that the speed is equal to or lower than 30 km per hour and the steering angle is equal to or greater than 40 degrees to the left has been illustrated. However, the invention is not limited thereto. In regards to the detection condition of "normal traveling" or "high-speed traveling", the speed per hour may be lower or higher than 60 km, the value of the steering angle may be different, the steering angle may not be included in the condition, or other conditions may be included. In regards to the detection condition of "during right turn" or "during left turn", the steering angle may be greater than 40 degrees in the respective directions, the steering angle may be smaller than 40 degrees insofar as right turn can be specified, the value of the speed per hour may be different, the speed per hour may not be included in the condition, or other conditions may be included.

In the respective embodiments, a case where an attribute corresponding to each of pedestrians P1, P2 who cross a road in a traveling direction has high priority, and an attribute corresponding to an object out of a traveling road has low priority has been illustrated. However, the invention is not limited thereto. An attribute having high priority may be made to correspond to a situation having high importance or priority as a vehicle situation, and an attribute having low priority may be made to correspond to a situation having low importance or priority as a vehicle situation. For example, an attribute corresponding to a situation, in which there is an opposing straight traveling vehicle during right turn, there is an object having high collision possibility, and a driver is requested to avoid, as a vehicle situation may have high priority. An attribute corresponding to a situation of a position of a gas station when fuel is sufficient may have low priority. With this, improvement of the degree of freedom for design or applicability of a communication system is achieved.

In the respective embodiments, a case where the determination unit 142 outputs "data" of the communication message M to the display device 60 or the sound output device 61 has been illustrated. However, the invention is not limited thereto. Control may be performed such that the determination unit outputs data to be output to other ECUs or the like, such as a navigation system. With this, the expansion of the application range of data determined by the determination unit is achieved.

In the respective embodiments, a case where the elements included in the attribute are the category, the importance, and the expiration date has been illustrated. However, the invention is not limited thereto. As the elements included in the attribute, elements other than the category, the importance, and the expiration date, for example, the output period, priority, and the like may be included. All or some of the category, the importance, and the expiration date may not be included in the attribute. With this, the degree of freedom for design or applicability of communication system is improved.

In the first embodiment, a case where an attribute is acquired from a combination of "CAN ID" and "situation code" corresponding to data through one attribute code has been illustrated. However, the invention is not limited thereto. An attribute may be acquired from a combination of "CAN ID" and "situation code" through a plurality of attribute codes or the like halfway. With this, improvement of the degree of freedom for design of a communication system is achieved.

In the first embodiment, a case where a combination of "CAN ID" and "situation code" is made to correspond to an attribute through "attribute code" has been illustrated. However, the invention is not limited thereto. A combination of "CAN ID", "position code", and "situation code", a combination of "address" and "situation code", or a combination of "address", "position code", and "situation code" may be made to correspond to an attribute through "attribute code". With this, improvement of the degree of freedom for design of a communication system is achieved.

In the respective embodiments, a case where an address which directly indicates a memory address is used as an identification code has been illustrated. However, the invention is not limited thereto. An identification code may be indicated indirectly using a pointer, a label, or the like insofar as a position at which data is held can be specified. With this, improvement of the degree of freedom for design of a communication system is achieved.

In the first and second embodiments, a case where "CAN ID" is used as "identification code" has been illustrated. However, the invention is not limited thereto. The "identification code" may be different from "CAN ID". With this, improvement of the degree of freedom for design of a communication system is achieved.

In the respective embodiments, although a case where the vehicle outside environment is detected based on an image captured by the camera 40 has been illustrated, the invention is not limited thereto. The vehicle outside environment may be detected based on map information, center information obtained from a center, or information relating to other vehicles obtained from other vehicles or the like insofar as a necessary vehicle outside environment can be detected. With this, improvement of the degree of freedom for design of a communication system is achieved.

In the respective embodiments, although a case where the vehicle state is detected based on information obtained from the vehicle speed sensor 30, the steering angle sensor 31, and the acceleration sensor 32 has been illustrated, the invention is not limited thereto. The vehicle state may be detected based on information obtained from other sensors insofar as a necessary vehicle situation can be detected. With this, improvement of the degree of freedom for design of a communication system is achieved.

In the respective embodiments, a case where the vehicle situation includes four situations of "normal traveling", "during right turn", "during left turn", and "high-speed traveling" has been illustrated. However, the invention is not limited thereto. The vehicle situation may include situations other than the above-described four situations. For example, the vehicle situation may include, as the vehicle state, settings by the user, the presence/absence of route guidance, the number of passengers, the residual amount of fuel, and the like.

The vehicle situation may include, as the vehicle outside environment, road situations, the positions of other vehicles, obstacles, weather, day and night, light and dark, and the like. An outside environment which is an environment outside a vehicle is detected as one of the vehicle situations, it is possible to make an attribute according to a vehicle state correspond to the communication message M.

At least one of the above-described four situations may not be included in the vehicle situation. With this, improvement of the degree of freedom for design or applicability of a communication system is achieved.

In the respective embodiments, although a case where "situation code" is represented by 3 bits has been illustrated, the invention is not limited thereto. The situation code may be represented by more bits than 3 bits. With this, it is possible to make appropriate attributes correspond to more vehicle situations.

In the respective embodiments, a case where a corresponding attribute is acquired from a combination of "CAN ID" and "situation code", a combination of "CAN ID", "position code", and "situation code", a combination of "address" and "situation code", or a combination of "address", "position code", and "situation code" has been illustrated. However, the invention is not limited thereto. Another code may be included in each combination described above, and the attribute may be acquired in consideration of another code as well. With this, improvement of the degree of freedom for design of a communication system is achieved.

In the respective embodiments, a case where the vehicle 1 is an automobile has been illustrated. However, the invention is not limited thereto. The communication system may be provided in a mobile object other than a vehicle, such as an automobile, for example, a vessel, a railroad, an industrial machine, a robot, or the like.

The invention claimed is:

1. A communication system that transmits and receives a communication message including a defined amount of data and an identifier determined for each of the contents of data, the communication system comprising:
    a control device that receives the communication message and that includes an information processing unit that processes data in the communication message, a vehicle situation detection unit that detects a vehicle situation, and an attribute storage unit that stores attributes, wherein
    the attribute storage unit stores an identification code corresponding to the identifier, a situation code determined according to the vehicle situation, and an attribute determined corresponding to a combination of the identification code and the situation code as the attribute, and
    the information processing unit acquires, based on a combination of the identification code corresponding to the identifier of the received communication message and the situation code corresponding to the vehicle situation detected by the vehicle situation detection unit, an attribute corresponding to the combination among the attributes stored in the attribute storage unit, and processes data of the received communication message based on the acquired attribute, wherein
    the control device that receives the communication message includes a data storage unit in which data is held in a determined address for each piece of data acquired from the received communication message, and an identification code stored in the attribute storage unit is determined based on an address of the data storage unit in which data of a corresponding communication message is held, wherein
    the attribute stored in the attribute storage unit includes information of an expiration date of data corresponding to the attribute,
    the control device that receives the communication message further includes a determination unit that performs determination about whether or not data of the received communication message is able to be processed until an expiration date included in an attribute corresponding to data, and
    when processing of data of another received communication message is performed after processing of data of one received communication message ends, and when the determination unit determines that the processing of data of another received communication message is completed before an expiration date included in an attribute of data of another received communication message, the information processing unit starts the processing of data of another received communication message after the processing of data of the one received communication message ends so as to prevent simultaneous output of data of the one received communication message and the another received communication message.

2. The communication system according to claim 1, wherein
    the identification code stored in the attribute storage unit matches the identifier of the communication message.

3. The communication system according to claim 1, wherein
    the attribute storage unit stores an attribute code corresponding to each attribute, and a combination of an identification code and a situation code corresponding to the attribute code, and the information processing unit acquires an attribute corresponding to the same attribute code as an attribute code corresponding to a combination of an identification code and a situation code as an attribute corresponding to the combination.

4. The communication system according to claim 1, wherein
    the information processing unit acquires a vehicle situation from the vehicle situation detection unit with the reception of a communication message.

5. The communication system according to claim 1, wherein
    the plurality of control devices are communicably connected by a CAN bus, and transmits and receives a communication message through the CAN bus.

6. A communication system that transmits and receives a communication message including a defined amount of data and an identifier determined for each of the contents of data, the communication system comprising:
    an electronic control unit (ECU) programmed to:
        receive the communication message;

process data in the communication message;
detect at least one of (i) a vehicle outside environment, including positions of obstacles outside the vehicle or (ii) a traveling speed and direction of the vehicle based on information acquired from vehicle sensors;
store an identification code corresponding to the identifier in the received communication message, and a situation code corresponding to the at least one of (i) the vehicle outside environment or (ii) the traveling speed and direction of the vehicle, and
determine an attribute, from among attributes stored in the ECU, corresponding to a combination of the identification code and the situation code;
wherein the data of the received communication message is processed based on the determined attribute, wherein
the ECU includes a data storage unit in which data is held in a determined address for each piece of data acquired from the received communication message, and the identification code stored in the ECU is determined based on an address of the data storage unit in which data of a corresponding communication message is held.

7. A communication system that transmits and receives a communication message including a defined amount of data with a plurality of pieces of information and an identifier determined for each of the contents of data, the communication system comprising
a control device that receives the communication message and that includes an information processing unit that processes data in the communication message, a vehicle situation detection unit that detects a vehicle situation, and an attribute storage unit that stores attributes, wherein
the attribute storage unit stores an identification code corresponding to the identifier of the communication message, a position code representing a data position in the communication message for each piece of information included in the communication message, a situation code determined according to the vehicle situation, and an attribute determined corresponding to a combination of the identification code, the position code, and the situation code as the attribute, and
the information processing unit acquires, based on a combination of the identification code corresponding to the identifier of the received communication message, the position code of each piece of information included in the received communication message, and the situation code corresponding to the vehicle situation detected by the vehicle situation detection unit, an attribute corresponding to the combination among the attributes stored in the attribute storage unit, and processes data of the received communication message based on the acquired attribute, wherein
the control device that receives the communication message includes a data storage unit in which data is held in a determined address for each piece of data acquired from the received communication message, and an identification code stored in the attribute storage unit is determined based on an address of the data storage unit in which data of a corresponding communication message is held, wherein
the attribute stored in the attribute storage unit includes information of an expiration date of data corresponding to the attribute,
the control device that receives the communication message further includes a determination unit that performs determination about whether or not data of the received communication message is able to be processed until an expiration date included in an attribute corresponding to data, and
when processing of data of another received communication message is performed after processing of data of one received communication message ends, and when the determination unit determines that the processing of data of another received communication message is completed before an expiration date included in an attribute of data of another received communication message, the information processing unit starts the processing of data of another received communication message after the processing of data of the one received communication message ends so as to prevent simultaneous output of data of the one received communication message and the another received communication message.

8. The communication system according to claim 7, wherein
the attribute storage unit stores an attribute code corresponding to each attribute, and a combination of an identification code, a position code, and a situation code corresponding to the attribute code, and
the information processing unit acquires an attribute corresponding to the same attribute code as an attribute code corresponding to a combination of an identification code, a position code, and a situation code as an attribute corresponding to the combination.

* * * * *